3,466,250
METHOD FOR ACTIVATING ALUMINA CATALYSTS
Joseph P. Giannetti, Oakmont, Alfred M. Henke, Springdale, Raynor T. Sebulsky, Verona, and William C. Starnes, Cabot, Pa., assignors to Gulf Research & Development Company, Pittsburgh, Pa., a corporation of Delaware
No Drawing. Filed Oct. 20, 1965, Ser. No. 499,060
Int. Cl. B01j *11/64, 11/58, 11/16*
U.S. Cl. 252—442                                      6 Claims

ABSTRACT OF THE DISCLOSURE

An activated alumina catalyst and its method of activation, which method comprises treating the catalyst with a particular type of phosphorous halide containing at least two chlorine atoms.

Our invention relates to a low temperature isomerization catalyst and the method of its preparation.

In accordance with our invention an alumina catalyst is activated by treating the catalyst with a phosphorous halide compound at an elevated temperature thereby substantially increasing the chlorine content of such catalyst composite. Generally, the catalyst, substantially in the form in which it is to be employed as a catalyst is contacted with the phosphorous halide compound. This can be conveniently accomplished for example, by placing the catalyst composite in a column and then heating the composite to the desired temperature in the range from about 300° to about 1200° F., preferably above about 500° F., and advantageously in the range from about 600° to about 1100° F. This heating can be effected by employing any of the techniques well-known in the art, such as, for example, passing a heated inert gas through the bed of catalyst composite in the column. After the catalyst has been raised to the desired temperature a stream of the phosphorous halide compound, if it is gaseous, together with an inert carrier, such as nitrogen, also at the elevated temperature, is passed through the bed of catalyst in the column. If the phosphorous halide compound does not become gaseous but remains a liquid at the elevated temperature, it can be trickled over the bed of catalyst. In such instance the phosphorous halide can be employed with an inert diluent, if desired. On the other hand, if the phosphorous halide compound is a solid, it can simply be admixed with the catalyst and the mixture raised to the desired temperature, preferably in the presence of an inert medium, such as nitrogen. We usually find it advantageous to employ a quantity of the phosphorous halide compound in stoichiometric excess of that required to provide the desired quantity of chlorine in the treated catalyst. There does not appear to be any advantage to employing more than about 3 or 4 times the stoichiometric quantity of phosphorous halide compound required to provide the final chlorine content of the catalyst and usually one and one-half to two and one-half times the stoichiometric quantity of the phosphorous halide compound is adequate. Generally, we have found that increasing the chlorine content of the catalyst by our phosphorous halide treatment so that finished catalyst has a chlorine content of about 3 to about 10 percent by weight chlorine based on the total catalyst substantially increases the activity of the catalyst. Preferably, however, the finished catalyst will contain from about 4 to about 8 percent chlorine.

The phosphorous halide compounds which are suitable for employment in our invention broadly include those having the generic formula $PS_aX_bY_c$, wherein P is phosphorus, S is sulfur, X is chlorine, Y is a halogen other than chlorine, $a$ is 0 or 1, $b$ is 2, 3, 4 or 5 and $c$ is 0, 1, 2 or 3. Examples of such phosphorous halides include, among others, phosphorous trichloride, phosphorous pentachloride, phosphorous oxychloride, phosphorus thiochloride and phosphorous dichloridetrifluoride.

For purposes of controlling the amount of a gaseous phosphorous halide compound being contacted with the catalyst at any one time and thus control more accurately the amount of chlorine added to the catalyst, we prefer to dilute such phosphorous halide compound with an inert gas such as the nitrogen mentioned above. As a practical matter it is desirable to avoid employment of excessive quantities of diluent. The concentration of phosphorous halide in the phosphorous halide-diluent mixture is also to a great extent determinative of the length of treatment required in order to add a desired quantity of chlorine to the catalyst. Generally, we have found that the phosphorous halide can be diluted to a sufficient extent to provide adequate control of the chlorine addition to the catalyst, while employing a not unreasonable volume of material and permitting activation by adding the desired amount of chlorine to the catalyst within a period of time usually less than 3 or 4 hours. Adding the phosphorous halide to a carrier stream flowing at the rate from about 0.01 to about 10.0 and preferably from about 0.1 to 1.0 volumes of carrier per hour per volume of catalyst is a satisfactory technique. Thus, for example, when employing such technique, twice the stoichiometric quantity of phosphorous halide required to provide a finished catalyst containing about 5 to 8 percent chlorine can be contacted with the composite at a temperature of about 750° to 800° F. in about an hour to an hour and a half.

In practicing the phoshporous halide treatment of uor invention it is essential that the catalyst be contacted with the phosphorous halide compound at a temperature above about 300° F. and preferably above about 500° or 600° F. It is not necessary that the temperature at the time of initial contacting be in this range, although desirably it is, but it is sufficient that the temperature be raised to above the minimum temperature mentioned above while the catalyst and phosphorous halide are still in contact and before the temperature is reduced to ambient conditions or before the catalyst is contacted with air. Thus, for example, the catalyst and the phosphorous halide could be initially contacted at a temperature of about 200° or 300° F. and the temperature then raised to about 750° or 800° F. while maintaining the catalyst and phosphorous halide in contact.

We have found that the minimum temperature of 300° F. mentioned above can be suitable for treatment of catalysts with a phosphorous halide in accordance with our invention when the value of $a$ in the generic formula $PS_aX_bY_c$ is equal to zero. Illustrative of such phosphorous halide compounds are phosphorous pentachoride and phosphorous trichloride. Although satisfactory results can be obtained when employing a phosphorous halide of this type in accordance with our invention at a temperature as low as 300° F., we prefer, however, to employ temperatures above about 500° F. Generally, the employment of these higher temperatures above 500° F. provides a treated catalyst having a higher chlorine content in a shorter period of time. When practicing the method of our invention and employing a phosphorous halide of the generic formula $PS_aX_bY_c$, wherein $a$ is equal to one, we have found that it is necessary to employ a temperature of at least about 600° F. and preferably a temperature in the range from about 700° to about 900° F. in order to effect catalyst promotion by chlorine addition.

It must also be pointed out that the chlorine-containing treated catalysts obtained in accordance with our invention may at times also contain a small amount of phosphorus which is substantially less than the chlorine content of the same catalyst. Generally, the phosphorous content, if any, of the catalysts obtained in accordance with our invention is not believed to be sufficient to have any substantial effect, either good or bad, on the catalytic properties of the treated material.

The catalysts from which the activated catalysts of our invention are derived can comprise any form of porous alumina suitable for use as a catalytic agent or support. For example, excellent results are obtainable with aluminas prepared by calcining a β-alumina trihydrate, such as, bayerite or mixtures thereof with other alumina hydrates. Aluminas prepared by calcining other hydrated aluminas, such as, the amorphous alumina formed by hydrolysis of aluminum methoxide, or crystallized alumina hydrates, such as, α-alumina trihydrate or gibbsite, or naturally occurring materials containing the same, such as, bauxite, nordstrandite and α- and β-alumina monohydrates, such as, boehmite and diaspore or combinations thereof can also be used. Further, there can be used the aluminas described in U.S. Patents Nos. 3,151,939, 3,151,940 and 3,188,174 of Kehl and Stewart, which aluminas are prepared by calcining an aluminum hydroxide containing 1.2 to 2.6 moles of water of hydration. The alumina carriers useful in the present invention can be essentially pure aluminas or they can contain small amounts, up to about 45 percent of other refractory oxides, such as, silica, beryllia, titania, zirconia or boria or they can contain up to about 10 percent by weight of a Friedel-Crafts metal combined with the alumina. Such aluminas are generally characterized by a high surface area generally ranging from about 150 to 500 square meters per gram. Especially advantageous results are obtainable when using aluminas having a surface area above about 250 and more particularly above about 300 square meters per gram, although aluminas of lower surface areas can be used.

The alumina supports of precursors from which the activated aluminas of this invention are prepared advantageously can be composited with a small proportion of at least one metalliferous hydrogenating component such as metals selected from Group VI and Group VIII. Examples of such materials are platinum, palladium, rhodium, iridium, nickel and tungsten. Especially good results are obtainable with platinum and palladium. Generally, the hydrogenating component will be present in an amount from about 0.01 to 5.0 percent by weight of the total catalyst composite, and preferably from 0.1 to 2.0 percent by weight. By way of example, excellent results are obtainable with 0.3 to 0.7 percent platinum or 1 percent palladium on alumina.

The hydrogenating component can be composited with the alumina in any convenient way. Thus, for example, the hydrogenating component can be deposited on a precalcined alumina support in the form of an aqueous solution of a water soluble salt, after which the wetted alumina support can be calcined. Examples of such solutions are ones containing chloroplatinic or other halogen platinum acids or aqueous solutions of nickel and tungsten nitrate in the desired proportion relative to one another. Alternatively, the hydrogenating component can be added to the alumina hydrate prior to precipitation with a substance such as hydrogen sulfide followed by calcining. Additionally, an aqueous metal sulfide sol, for example, a platinum sulfide sol can be used to impregnate an alumina hydrate or can be admixed with an alumina solution prior to drying and calcining.

It is important that the hydrogenating component be composited with the alumina carrier before the phosphorous halide activation treatment, inasmuch as deposition thereafter will normally result in a reduced chlorine content of the treated composite. This is generally undesirable since the activity of the present catalyst appears to be related generally to the increased chlorine content obtained by our treatment.

The alumina base can also contain halogen other than that obtained by the phosphorous halide treatment. For example, some halogen content may result from use of an aluminum halide as a starting material to form the alumina carrier or alternatively some halogen may remain in the catalyst owing to the use of a halogen-noble metal acid. The halogen content from sources such as these, however, does not appear to be equivalent for the purposes of our invention to the halogen content resulting from the phosphorous halide treatment.

The catalysts of our invention are suitable for isomerizing a hydrocarbon feed stock consisting essentially of saturated hydrocarbons by contacting such feed stock with hydrogen under isomerization conditions in the presence of the particular catalyst of our invention described above.

The feed stocks suitable for employment in the process include any hydrocarbon fraction or stock which is substantially free of olefinic type components, and which contains a significant proportion of relatively unbranched hydrocarbons, such as paraffins and naphthenes. It is essential that the feed stock employed in the process does not contain any appreciable amount of olefins since they appear to destroy the effectiveness of our catalysts to isomerize saturated compounds. Our catalysts are effective to isomerize not only completely unbranched materials, such as n-paraffins, to branched materials, such as isoparaffins, but are also effective to isomerize relatively unbranched hydrocarbons, such as, for example, the methylpentanes, to more highly branched forms, such as, for example, the dimethylbutanes. Illustrative of sources of such stocks available from various refinery operations are the paraffin rich streams obtained from the raffinate phase of the Udex of Sulfolane process. In the event that such refinery streams contain a significant quantity of olefins it may be necessary to subject them to hydrogenation in order to saturate the olefins prior to charging the material to our process.

The operating conditions employed in the isomerization process include a temperature in the range from about 75° to about 500° F., preferably from 150° to about 400° F.; a pressure from about 0 to about 3000 p.s.i.g., preferably from 0 to about 1000 p.s.i.g.; a liquid hourly space velocity from about 0.1 to about 10.0, preferably from about 0.5 to 4.0 volumes of feed per hour per volume of catalyst; and a hydrogen to feed stock mole ratio from about 0.1 to 10.0, preferably from about 0.1 to 4.0.

In order to illustrate our invention in greater detail reference is made to the following examples:

EXAMPLE I

A 125 gram sample of a reduced, commercially available platinum-alumina composite containing about 0.6 percent by weight platinum was heated to 800° F. in a nitrogen atmosphere at atmospheric pressure. During a 75 minute period a phosphorous oxychloride stream containing a total quantity of about 45 grams of phosphorous oxychloride together with nitrogen was passed over the platinum-alumina composite. Analysis of the treated catalyst composite indicated that it contained 10 percent by weight chlorine.

EXAMPLE II

A 125 ml. sample of the catalyst prepared in Example I was placed in a stirred autoclave to which was charged 500 ml. of n-hexane. The system was placed under a hydrogen pressure of 300 p.s.i.g. and the temperature was raised to 275° F. over a three hour period and held at this temperature for an additional three hours at which time the reaction was terminated. Analysis of the product obtained indicated a conversion of 71 percent of the n-hexane charge to branched isomers. Equilibrium hexane conversion at 275° F. is 87 percent. This indicates that the catalyst of Example I is effective to catalyze the isomerization of n-hexane and that even though the reaction was terminated after only three hours of operation, a conversion of 71 percent was obtained.

EXAMPLE III

In this example, a 61.6 gram sample of a reduced, commercially available platinum-alumina catalyst containing 0.7 percent platinum and 0.8 percent chlorine was admixed with 15.4 grams of solid phosphorous pentachloride. While maintaining a flow of 0.5 cubic feet per hour of dry nitrogen over the catalyst and phosphorous pentachloride mixture the temperature was slowly raised to 510° F. in a four hour period and was then held at this temperature for an additional period of four and one-half hours. After this treatment the catalyst was allowed to return to room temperature and was then subjected to analysis. The treated catalyst weighed 64.1 grams and had a chlorine content of 4.9 percent by weight.

EXAMPLE IV

In this example another sample of the reduced, commercially available platinum-alumina catalyst employed in Example III is treated in the same manner as described in Example III but employing a treating temperature of 750° F. rather than 510° F. The catalyst treated at the higher temperature of this example has an increased chlorine content in the range from about 8 to 10 percent by weight.

EXAMPLE V

Another sample of the reduced, commercially available platinum-alumina catalyst of Example I is subjected to treatment with a quantity of phosphorus thiochloride equal to about 25 percent by weight of the commercial catalyst at a temperature of about 700° F. for a period of several hours. This treatment results in a catalyst containing about 4 percent by weight of chlorine.

We claim:

1. A method of activating an alumina catalyst which comprises treating the catalyst with a liquid or solid phosphorous halide at nonreducing conditions at a temperature in the range from about 600° to about 1200° F., the phosphorous halide having the generic formula $PS_aX_bY_c$, wherein P is phosphorous, S is sulfur, X is chlorine, Y is a halogen other than chlorine, $a$ is 1, $b$ is 2, 3, 4 or 5 and $c$ is 0, 1, 2 or 3.

2. The method of claim 1 wherein the temperature is from about 600° to about 1100° F.

3. The method of claim 1 wherein the temperature is from about 700° to about 900° F.

4. The method of claim 1 wherein the phosphorous halide is phosphorous thiochloride.

5. The method of claim 1 wherein a minor proportion of a metalliferous hydrogenating component is composited with the alumina, present in a major proportion.

6. A method of activating a composite catalyst comprising a minor proportion of a metalliferous hydrogenating component composited with a major proportion of an alumina carrier which comprises treating the catalyst with a liquid or solid phosphorous halide at nonreducing conditions at a temperature in the range from about 600° to about 1200° F., the phosphorous halide having the generic formula $PS_aX_bY_c$, wherein P is phosphorous, S is sulfur, X is chlorine, Y is a halogen other than chlorine, $a$ is 1, $b$ is 2, 3, 4 or 5 and $c$ is 0, 1, 2 or 3.

References Cited

UNITED STATES PATENTS

| | | | |
|---|---|---|---|
| 2,611,736 | 9/1952 | Haensel | 252—441 |
| 3,173,857 | 3/1965 | Haensel | 252—441 |
| 3,227,658 | 1/1966 | Myers et al. | 252—442 |
| 3,242,228 | 3/1966 | Riordan et al. | 252—441 |
| 3,268,602 | 7/1966 | Goble et al. | 252—442 |

PATRICK P. GARVIN, Primary Examiner

U.S. Cl. X.R.

252—437; 260—683.7, 683.75